United States Patent
Ni et al.

(10) Patent No.: US 10,622,124 B2
(45) Date of Patent: Apr. 14, 2020

(54) HIGH TEMPERATURE NEGATIVE TEMPERATURE COEFFICIENT THERMISTOR MATERIAL AND PREPARATION METHOD THEREOF

(71) Applicant: SOOK AUTOMOTIVE COMPONENTS (JIANGSU) CO., LTD, Yangzhou (CN)

(72) Inventors: Li Ni, Yangzhou (CN); Shenglin Jiang, Yangzhou (CN); Dong Su, Yangzhou (CN); Mingya Li, Yangzhou (CN); Anqi Feng, Yangzhou (CN); Chao Zhang, Yangzhou (CN); Qing Zhao, Yangzhou (CN); Bo Zhang, Yangzhou (CN); Yang Zhou, Yangzhou (CN); Ju Fang, Yangzhou (CN); Lilong Fang, Yangzhou (CN)

(73) Assignee: SOOK Automotive Components (JiamgSu) Co., Ltd, Yangzhou (CN)

( * ) Notice: Subject to any disclaimer, the term of this patent is extended or adjusted under 35 U.S.C. 154(b) by 0 days.

(21) Appl. No.: 16/341,880

(22) PCT Filed: Dec. 25, 2018

(86) PCT No.: PCT/CN2018/123419
§ 371 (c)(1),
(2) Date: Apr. 12, 2019

(87) PCT Pub. No.: WO2019/096335
PCT Pub. Date: May 23, 2019

(65) Prior Publication Data
US 2019/0237225 A1 Aug. 1, 2019

(51) Int. Cl.
*H01C 7/04* (2006.01)
*H01C 17/065* (2006.01)
(Continued)

(52) U.S. Cl.
CPC .......... *H01C 7/045* (2013.01); *C01G 45/02* (2013.01); *C04B 35/016* (2013.01);
(Continued)

(58) Field of Classification Search
CPC ...... H01C 7/045; C01G 45/02; C04B 35/016; C04B 35/505
(Continued)

(56) References Cited

U.S. PATENT DOCUMENTS 5,658,485 A * 8/1997 Cava ............... C04B 35/499
 252/62.9 PZ
2008/0009572 A1* 1/2008 Khatua ............ C04B 35/4682
 524/160

* cited by examiner

Primary Examiner — Kyung S Lee
Assistant Examiner — Iman Malakooti
(74) Attorney, Agent, or Firm — CBM Patent Consulting, LLC

(57) ABSTRACT

A composite thermistor material, a preparation method and an application thereof. The perovskite structure oxide and the pyrochlorite structure oxide are composite by solid state reaction method, which comprise process of ball milling, drying, and calcining. Then the thermistor ceramics with high temperature resistance and controllable B value are sintered at high temperature after mould forming, then the thermistor disks are coated by platinum paste, and then the platinum wire is welded as the lead wire to form thermistor element. The thermistor of the invention can realize temperature measurement from room temperature to 1000° C. and has good negative temperature coefficient thermistor characteristics. The thermistor coefficient B can be adjusted by changing the two-phase ratio to meet the requirements of different systems.

8 Claims, 2 Drawing Sheets

(51) Int. Cl.
    *C04B 35/634*     (2006.01)
    *C04B 35/505*     (2006.01)
    *C01G 45/02*     (2006.01)
    *C04B 41/51*     (2006.01)
    *C04B 41/00*     (2006.01)
    *C04B 41/88*     (2006.01)
    *C04B 35/622*     (2006.01)
    *C04B 35/626*     (2006.01)
    *C04B 35/01*     (2006.01)
    *G01K 7/22*     (2006.01)

(52) U.S. Cl.
CPC .......... C04B 35/505 (2013.01); C04B 35/622 (2013.01); C04B 35/62685 (2013.01); C04B 35/63416 (2013.01); C04B 41/009 (2013.01); C04B 41/5122 (2013.01); C04B 41/88 (2013.01); H01C 17/06533 (2013.01); *C04B 2235/3206* (2013.01); *C04B 2235/3208* (2013.01); *C04B 2235/3225* (2013.01); *C04B 2235/3229* (2013.01); *C04B 2235/3232* (2013.01); *C04B 2235/3234* (2013.01); *C04B 2235/3241* (2013.01); *C04B 2235/3258* (2013.01); *C04B 2235/3262* (2013.01); *C04B 2235/3265* (2013.01); *C04B 2235/6567* (2013.01); *C04B 2235/768* (2013.01); *C04B 2235/80* (2013.01); *G01K 7/22* (2013.01)

(58) Field of Classification Search
    USPC ....................................................... 338/22 R
    See application file for complete search history.

HIGH TEMPERATURE NEGATIVE TEMPERATURE COEFFICIENT THERMISTOR MATERIAL AND PREPARATION METHOD THEREOF

BACKGROUND OF THE PRESENT INVENTION

Field of the Present Invention

The invention belongs to the field of temperature sensing technique, more particularly relates to a composite thermal thermistor material and a preparation method thereof, in which the prepared thermal thermistor material can be used for a temperature sensing technique.

Description of the Related Art

The negative temperature coefficient (NTC) thermistor is widely used in different kinds of circuit system as a compensate device, whose resistance decrease with the temperature rising up. Compare with the traditional temperature sensing element such as thermocouple, thermal resistance, the main characteristic of NTC thermistor is their high sensibility and low cost. The high temperature NTC thermistor is more stable than normal NTC thermistor, so it can be used for temperature of 1000° C., which makes it a better choice as temperature sensing element in high temperature automobile applications.

The main parameters of NTC is the resistivity and their negative temperature coefficient B, which was used to evaluate the relation between resistivity and temperature. In order to realize the temperature detection range from 0° C. to 1000° C., it is important for the NTC thermistor to simultaneously possess high resistivity and low B value. However, too high B value will lead to less resistivity in high temperature but too low B value will influence the sensitivity. Usually, the range of B value for high temperature NTC is 2000~4000, and it is difficult to tune the B value for a given system. Thus, there is urgent need to develop a method to tune the B value for NTC materials.

SUMMARY OF THE PRESENT INVENTION

In view of the above-described problems, the present invention provides a composite NTC material and a preparation method thereof, which can achieve the tunable B value to fabricate high temperature NTC thermistor by synthesis two different kinds of materials. Meanwhile, the NTC thermistor can effectively used with B value from 2000~4000, with the good performance of long-term stability and NTC effect.

In order to achieve the above objective, according to an aspect of the present invention, there is provided a composite NTC thermistor material, wherein the NTC thermistor material is formed by oxides of pyrochlorite and perovskite. The ratio of two materials is (70:30)~(90:10), the main elements in oxide of pyrochlorite are calcium, titanium, tungsten and cerium. Correspondingly, the main elements in oxide of perovskite is yttrium, manganese and chromium.

Further, the perovskite oxide and the pyrochlorite oxide are $YCr_{0.5}Mn_{0.5}O_3$ and $CaWO_4$—$CeTi_2O_6$, respectively.

Further, the molar ratio of yttrium manganese and chromium in the perovskite structure oxide is (2~2.5):(0.8~1.2):(0.8~1.2). The molar ratio of calcium, titanium, tungsten and cerium in the calcined chlorite oxide is (0.8~1.2):(0.8~1.2):(0.8~1.2):(2~2.5).

For example, the molar ratio of yttrium manganese and chromium in perovskite oxides is 2:1:1, and the molar mass ratio of calcium, titanium, tungsten and cerium in the calcined chlorite oxide is 1:1:1:2. The optimum resistivity and B value of the prepared composite thermistors can be achieved by using the molar mass ratio. The properties of the prepared composite thermistors are superior.

According to another aspect of the present invention, there is provided a preparation method of a composite NTC material, comprising:

(1) The analytical pure $Y_2O_3$, $Mn_2O_3$ and $Cr_2O_3$ are mixed grinding, and the molar ratio of the three is 2:1:1, then calcined the mixture at 1200° C. for 1-2 hours to obtain the $YCr_{0.5}Mn_{0.5}O_3$ oxide powder;

(2) The analytical pure $CaCO_3$, $CeO_2$, $TiO_2$ and $WO_3$ were mixed to grind, and the molar ratio of the four was 2:2:2:1, and then calcined the dried powder at 1000° C. for 3 h to obtain the $CaWO_4$—$CeTi_2O_6$ oxide powder;

(3) The perovskite oxide $YCr_{0.5}Mn_{0.5}O_3$ powder was prepared and the PVA binder was added to the perovskite oxide powder to disperse the perovskite oxide powder evenly, and the uniformly dispersed particles were sintered directly at 1400-1600° C. for 1-2 h.

(4) Taking step (3) perovskite oxide $YCr_{0.5}Mn_{0.5}O_3$ powder after sintering, and preparing calcined chlorite oxide $CaWO_4$—$CeTi_2O_6$ powder in step (2), grinding them uniformly for 4-8 h. The molar ratio of perovskite oxide $YCr_{0.5}Mn_{0.5}O_3$ powder to calcined chlorite oxide $CaWO_4$—$CeTi_2O_6$ powder is (70:30)~(90:10);

(5) Mixing and grinding the uniform powder in step (4) and adding the PVA binder to form the uniformly dispersed granular particles again, and then forming the uniformly dispersed particles into a wafer after the mold molding;

(6) The formed wafer is sintered at 1400° C. to form a B value adjustable thermistor material;

(7) The platinum paste is coated on the surface of the sintered thermistor material in step (6) and then kept at 1200° C. for 2 h;

(8) The thermistor material obtained in step (7) is cut according to the requirement, and the platinum lead is welded to the cut thermistor chip.

The invention also discloses an application of a composite thermistor material. The composite thermistor material is used to prepare a composite thermistor. The platinum wire was bonded to the two ends of the thermistor chip after cutting, and the high temperature thermistor with lead was formed after high temperature treatment at 1200° C.

The invention also discloses an application of a composite thermistor material. The composite thermistor material is used to prepare a high temperature dense ceramic thermistor temperature sensor.

Beneficial effect: the composite thermistor material in the invention, according to the ratio of its composite material, the obtained thermistor coefficient B value is different, which can be adjusted by the B value of 2000-4000 to meet the requirements of different industrial production. The invention can be widely used in the field of automobile exhaust gas measurement and various temperature measurement, and is a low price and stable thermistor material.

DETAILED DESCRIPTION OF THE EMBODIMENTS

Figure 1:
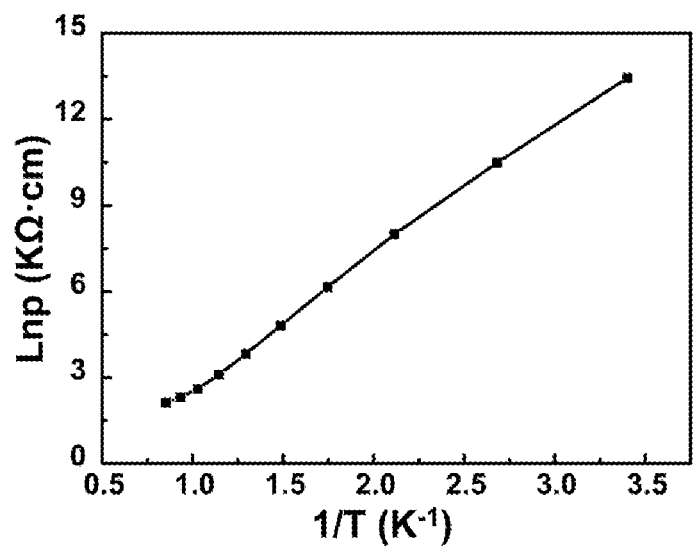
FIG. 1 is a schematic diagram of the resistance and temperature characteristic curve in embodiment 1.

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

The composite NTC thermistor material in the present invention is formed by perovskite structure oxide and pyrochlorite structure oxide. The molar ratio of the two materials is (70:30)~(90:10), and the perovskite structure oxide contains yttrium, manganese and chromium. The pyrochlorite oxide containing calcium, titanium, tungsten and cerium. Among them, perovskite oxide and pyrochlorite oxide are $YCr_{0.5}Mn_{0.5}O_3$ and $CaWO_4$—$CeTi_2O_6$, respectively. The molar ratio of yttrium, manganese and chromium in perovskite oxide is 2:1:1, and the molar ratio of calcium, titanium, tungsten and cerium in calcined chlorite oxide is 1:1:1:2. The composite NTC thermistor material can be prepared according the following steps:

(1) The analytical pure $Y_2O_3$, $Mn_2O_3$ and $Cr_2O_3$ are mixed grinding, and the molar ratio of the three is 2:1:1, then calcined the mixture at 1200° C. for 1-2 hours to obtain the $YCr_{0.5}Mn_{0.5}O_3$ oxide powder;

(2) The analytical pure $CaCO_3$, $CeO_2$, $TiO_2$ and $WO_3$ were mixed to grind, and the molar ratio of the four was 2:2:2:1, and then calcined the dried powder at 1000° C. for 3 h to obtain the $CaWO_4$—$CeTi_2O_6$ oxide powder;

(3) The perovskite oxide $YCr_{0.5}Mn_{0.5}O_3$ powder was prepared and the PVA binder was added to the perovskite oxide powder to disperse the perovskite oxide powder evenly, and the uniformly dispersed particles were sintered directly at 1400-1600° C. for 1-2 h.

(4) Taking step (3) perovskite oxide $YCr_{0.5}Mn_{0.5}O_3$ powder after sintering, and preparing calcined chlorite oxide $CaWO_4$—$CeTi_2O_6$ powder in step (2), grinding them uniformly for 4-8 h. The molar ratio of perovskite oxide $YCr_{0.5}Mn_{0.5}O_3$ powder to calcined chlorite oxide $CaWO_4$—$CeTi_2O_6$ powder is (70:30)~(90:10);

(5) Mixing and grinding the uniform powder in step (4) and adding the PVA binder to form the uniformly dispersed granular particles again, and then forming the uniformly dispersed particles into a wafer after the mold molding;

(6) The formed wafer is sintered at 1400° C. to form a B value adjustable thermistor material;

(7) The platinum paste is coated on the surface of the sintered thermistor material in step (6) and then kept at 1200° C. for 2 h;

(8) The thermistor material obtained in step (7) is cut according to the requirement, and the platinum lead is welded to the cut thermistor chip.

The composite thermistor material is used to prepare a composite thermistor. The platinum wire was bonded to the two ends of the thermistor chip after cutting, and the high temperature thermistor with lead was formed after high temperature treatment at 1200° C.

The composite thermistor material can also be used to fabricate high temperature dense ceramic thermistor temperature sensor.

Embodiment 1

A, preparing the composite NTC thermistor material, which specifically includes the following steps:

a, the prepared perovskite oxide $YCr_{0.5}Mn_{0.5}O_3$, and PVA binder are added to disperse the raw powder into granular form, then the uniformly dispersed powder is sintered at 1400-1600° C. for 1-2 h;

b, after sintering, perovskite oxide $YCr_{0.5}Mn_{0.5}O_3$ powder was obtained and mixed with the prepared $CaWO_4$—$CeTi_2O_6$ powder for 4-8 h at the molar ratio of 70:30;

c, the uniform powder was added to the binder to form the granular uniform dispersed powder again, and then formed the disk after the mould forming;

d, the formed disk was sintered at 1400-1500 temperature to form a B value adjustable thermistor material;

e, the platinum paste was coated on the surface of the sintered thermistor material and kept for 2 h at 1200° C.;

f, the platinum coated thermistor material is cut according to the requirement, and the platinum lead is welded to the cut thermistor chip;

g, the resistivity at room temperature (25° C.) is 2540 (k $\Omega$*cm), the resistivity at high temperature (900° C.) 0.0076 (k $\Omega$*cm), B value (25-200) is 4378, B value (200-800) is 4797, the temperature resistance curve is shown in FIG. 1;

Embodiment 2

Figure 2:
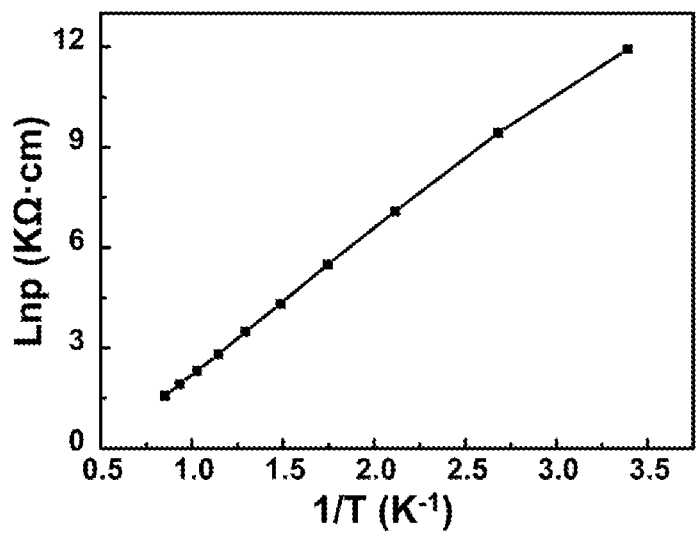
FIG. 2 is a schematic diagram of the resistance and temperature characteristic curve in embodiment 1.

B, preparing the composite NTC thermistor material, which specifically includes the following steps:

a, the prepared perovskite oxide $YCr_{0.5}Mn_{0.5}O_3$, and PVA binder are added to disperse the raw powder into granular form, then the uniformly dispersed powder is sintered at 1400-1600° C. for 1-2 h;

b, after sintering, perovskite oxide $YCr_{0.5}Mn_{0.5}O_3$ powder was obtained and mixed with the prepared $CaWO_4$—$CeTi_2O_6$ powder for 4-8 h at the molar ratio of 80:20;

c, the uniform powder was added to the binder to form the granular uniform dispersed powder again, and then formed the disk after the mould forming;

d, the formed disk was sintered at 1400-1500 temperature to form a B value adjustable thermistor material;

e, the platinum paste was coated on the surface of the sintered thermistor material and kept for 2 h at 1200° C.;

f, the platinum coated thermistor material is cut according to the requirement, and the platinum lead is welded to the cut thermistor chip;

g, the resistivity at room temperature (25° C.) is 151.62 (k $\Omega$*cm), the resistivity at high temperature (900° C.) 0.0048 (k $\Omega$*cm), B value (25-200) is 3798, B value (200-800) is 4370, the temperature resistance curve is shown in FIG. 2;

Embodiment 3

Figure 3:
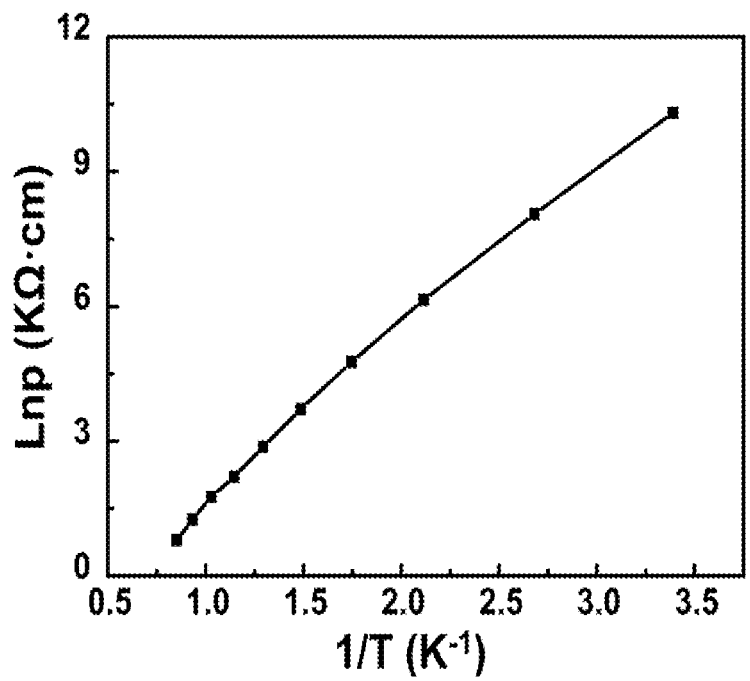
FIG. 3 is a schematic diagram of the resistance and temperature characteristic curve in embodiment 1.

C, preparing the composite NTC thermistor material, which specifically includes the following steps:

a, the prepared perovskite oxide $YCr_{0.5}Mn_{0.5}O_3$, and PVA binder are added to disperse the raw powder into granular form, then the uniformly dispersed powder is sintered at 1400-1600° C. for 1-2 h;

b, after sintering, perovskite oxide $YCr_{0.5}Mn_{0.5}O_3$ powder was obtained and mixed with the prepared $CaWO_4$—$CeTi_2O_6$ powder for 4-8 h at the molar ratio of 90:10;

c, the uniform powder was added to the binder to form the granular uniform dispersed powder again, and then formed the disk after the mould forming;

d, the formed disk was sintered at 1400-1500 temperature to form a B value adjustable thermistor material;

e, the platinum paste was coated on the surface of the sintered thermistor material and kept for 2 h at 1200° C.;

f, the platinum coated thermistor material is cut according to the requirement, and the platinum lead is welded to the cut thermistor chip;

g, the resistivity at room temperature (25° C.) is 30 (k$\Omega$*cm), the resistivity at high temperature (900° C.) 0.0022 (k $\Omega$*cm), B value (25-200) is 3263, B value (200-800) is 4135, the temperature resistance curve is shown in FIG. 3;

Embodiment 4

Figure 4:
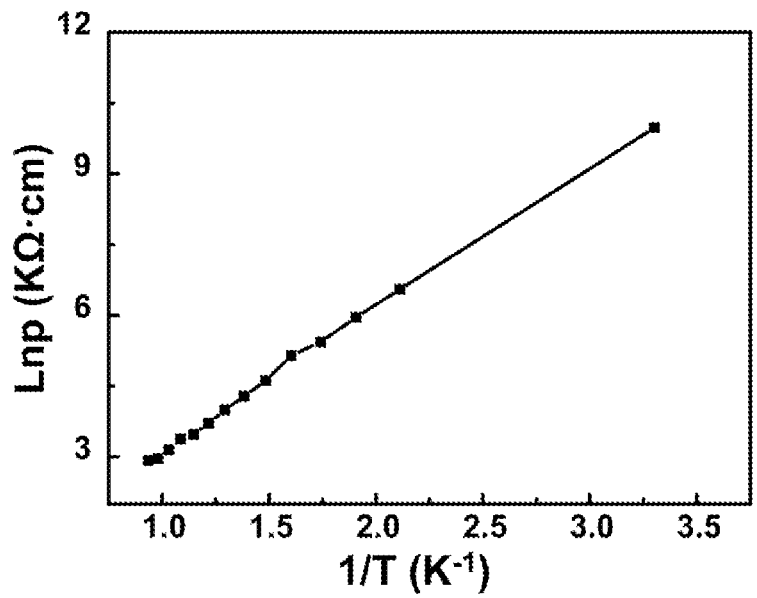
FIG. 4 is a schematic diagram of the resistance and temperature characteristic curve in embodiment 1.

D, preparing the composite NTC thermistor material, which specifically includes the following steps:

a, the analytical pure $Y_2O_3Mn_2O_3Cr_2O_3$ was mixed with the molar ratio of 2:1:1 and then calcined at 1200° C. for 1-2 h to obtain the $YCr_{0.5}Mn_{0.5}O_3$ oxide powder.

b, the powder obtained in step a is dried and added with binder to disperse the particles evenly, and the disk is formed by mould forming process.

d, the formed disk was sintered at 1400-1500 temperature to form a thermistor material;

e, the platinum paste was coated on the surface of the sintered thermistor material and kept for 2 h at 1200° C.;

f, the platinum coated thermistor material is cut according to the requirement, and the platinum lead is welded to the cut thermistor chip;

g, the resistivity at room temperature (25° C.) is 21.54 (k $\Omega$*cm), the resistivity at high temperature (800° C.) 0.01864 (k $\Omega$*cm), B value (25-200) is 2881, B value (200-800) is 3083, the temperature resistance curve is shown in FIG. 4.

What is claimed is:

1. A composite for a negative temperature coefficient (NTC) thermistor material, which is characterized by comprising a perovskite oxide and a pyrochlorite oxide, wherein the molar ratio of the perovskite oxides and the pyrochlorite oxide is (70:30) to (90:10); the perovskite oxides contains yttrium, manganese and chromium, the pyrochlorite oxide contains calcium, titanium, tungsten and cerium.

2. The composite according to claim 1, wherein the perovskite oxide and the pyrochlorite oxide are $YCr_{0.5}Mn_{0.5}O_3$ and $CaWO_4$—$CeTi_2O_6$, respectively.

3. The composite according to claim 1, wherein the molar mass ratio of yttrium, manganese, chromium in the perovskite oxide is (2-2.5):(0.8-1.2):(0.8-1.2), and the molar mass ratio of calcium, titanium, tungsten, cerium in the pyrochlorite oxide is (0.8-10.2):(0.8-10.2):(0.8-1.2):(2-2.5).

4. The composite according to claim 3, wherein the molar mass ratio of yttrium, manganese, chromium in the perovskite oxide is 2:1:1, and the molar mass ratio of the calcium, titanium, tungsten, cerium in the pyrochlorite oxide is 1:1:1:2.

5. A method for preparing a composite thermistor material, comprising the steps of:
(1) mixing and grinding pure $Y_2O_3$, $Mn_2O_3$ and $Cr_2O_3$ as a ground mixture, wherein the molar mass ratio of $Y_2O_3$:$Mn_2O_3$:$Cr_2O_3$, is 2:1:1; and then sintering the ground mixture at the temperature of 1100-1300° C. for 1-2 hours to obtain a $YCr_{0.5}Mn_{0.5}O_3$ oxide powder;
(2) mixing and grinding pure $CaCO_3$, $CeO_2$, $TiO_2$ and $WO_3$ as a ground powder, wherein the molar mass ratio of $CaCO_3$:$CeO_2$:$TiO_2$:$WO_3$ is 2:2:2:1; then grinding and drying the ground powder at the temperature of 950° C.~1050° C. for 3 h to obtain a $CaWO_4$—$CeTi_2O_6$ oxide powder;
(3) adding a PVA adhesive to make the $YCr_{0.5}Mn_{0.5}O_3$ powder in the step (1) form a granular uniform dispersion, sintering the granular uniform dispersion at temperature of 1400-1600° C. for 1-2 h to obtain a perovskite oxide $YCr_{0.5}Mn_{0.5}O_3$ powder;
(4) mixing and grinding the perovskite oxide $YCr_{0.5}Mn_{0.5}O_3$ powder and the $CaWO_4$—$CeTi_2O_6$ oxide powder for 4-8 h to obtain an uniformly mixed powder, wherein the molar ratio of the perovskite oxide $YCr_{0.5}Mn_{0.5}O_3$ powder: the $CaWO_4$—$CeTi_2O_6$ oxide powder is (70:30) to (90:10);
(5) adding the uniformly mixed powder into the PVA adhesive as to form a granular uniformly dispersed powders, then molding the granular uniformly dispersed powders into a disk;
(6) sintering the disk at temperature of 1400° C. to form a tunable B value thermistor material;
(7) coating a platinum paste on surface of the tunable B value thermistor material, and keeping the temperature at 1200° C. for 2 h to obtain a thermistor material;
(8) cutting the thermistor material into a thermistor chip, and welding a platinum wire lead to the thermistor chip.

6. The method for preparing the composite according to claim 5, wherein in the step (3), adding the PVA adhesive to the perovskite oxide $YCr_{0.5}Mn_{0.5}O_3$ powder and sintering at temperature of 1400-1500° C.

7. A process for preparing a composite thermistor with the composite for the NTC thermistor material of claim 1, wherein a platinum wire is bonded on two ends of a thermistor chip after cutting treatment, and a high-temperature thermistor with lead is formed after treatment at the temperature of 1200° C.

8. A process for preparing a high-temperature dense ceramic thermistor temperature sensor, wherein the high-temperature dense ceramic thermistor temperature sensor is made with the composite for the NTC thermistor material of claim 1.

* * * * *